(12) United States Patent
Kadomi et al.

(10) Patent No.: US 9,529,243 B2
(45) Date of Patent: Dec. 27, 2016

(54) LIQUID CRYSTAL ELEMENT AND CELL FOR LIQUID CRYSTAL ELEMENT

(71) Applicant: NIPPON ELECTRIC GLASS CO., LTD., Otsu-shi, Shiga (JP)

(72) Inventors: Masaaki Kadomi, Otsu (JP); Hirokazu Tanaka, Otsu (JP); Masanori Wada, Otsu (JP); Yoshimasa Yamaguchi, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 242 days.

(21) Appl. No.: 14/345,427

(22) PCT Filed: Oct. 1, 2012

(86) PCT No.: PCT/JP2012/075367
§ 371 (c)(1),
(2) Date: Mar. 18, 2014

(87) PCT Pub. No.: WO2013/061729
PCT Pub. Date: May 2, 2013

(65) Prior Publication Data
US 2014/0340624 A1    Nov. 20, 2014

(30) Foreign Application Priority Data
Oct. 25, 2011   (JP) .................. 2011-234151

(51) Int. Cl.
*G02F 1/13* (2006.01)
*G02F 1/29* (2006.01)
(52) U.S. Cl.
CPC . *G02F 1/29* (2013.01); *G02F 1/13* (2013.01); *G02F 2001/294* (2013.01)

(58) Field of Classification Search
CPC .......... G02F 1/29; G02F 1/13; G02F 2001/294
(Continued)

(56) References Cited

U.S. PATENT DOCUMENTS 6,147,732 A * 11/2000 Aoyama .............. G02B 5/3083
349/112
6,154,188 A * 11/2000 Learn ..................... H01J 29/90
174/50.61

(Continued)

FOREIGN PATENT DOCUMENTS

CN     101685224 A    3/2010
CN     101750784 A    6/2010
(Continued)

OTHER PUBLICATIONS

Official Communication issued in corresponding Chinese Patent Application No. 201280052680.0, mailed on Dec. 2, 2015.
(Continued)

*Primary Examiner* — Hoan C Nguyen
(74) *Attorney, Agent, or Firm* — Keating & Bennett, LLP

(57) ABSTRACT

Provided is a liquid crystal element of low drive voltage and high response speed. A liquid crystal element (1) includes a liquid crystal layer (11), first and second electrodes (21, 22), a high-resistivity layer (41), and an inorganic dielectric layer (42). The first and second electrodes (21, 22) are operable to apply voltage to the liquid crystal layer (11). The high-resistivity layer (41) is interposed between either one (21) of the first and second electrodes (21, 22) and the liquid crystal layer (11). The inorganic dielectric layer (42) is interposed between the high-resistivity layer (41) and the liquid crystal layer (11).

7 Claims, 4 Drawing Sheets

(58) Field of Classification Search
USPC .................................... 349/62, 95, 200, 201
See application file for complete search history.

(56) References Cited

U.S. PATENT DOCUMENTS

| | | | |
|---|---|---|---|
| 6,761,959 B1* | 7/2004 | Bonkowski | G03H 1/02 359/2 |
| 6,919,984 B2* | 7/2005 | Wall | H01C 17/242 359/290 |
| 2005/0094072 A1* | 5/2005 | Lu | G02F 1/13378 349/123 |
| 2008/0252862 A1 | 10/2008 | Okura et al. | |
| 2008/0297655 A1 | 12/2008 | Kamida | |
| 2009/0009865 A1 | 1/2009 | Nishida et al. | |

FOREIGN PATENT DOCUMENTS

| | | | |
|---|---|---|---|
| CN | 102221763 A | | 10/2011 |
| JP | 2003-098504 A | | 4/2003 |
| JP | 2006-145664 A | | 6/2006 |
| JP | 2008070669 | * | 9/2006 |
| JP | 2006-301232 A | | 11/2006 |
| JP | 2009157145 | * | 12/2007 |
| JP | 2008-203360 A | | 9/2008 |
| JP | 2009-037227 A | | 2/2009 |
| JP | 2011180373 | * | 3/2010 |
| JP | 2011-017742 A | | 1/2011 |
| JP | 4751600 B2 | | 8/2011 |

OTHER PUBLICATIONS

English translation of Official Communication issued in corresponding International Application PCT/JP2012/075367, mailed on May 8, 2014.

Official Communication issued in International Patent Application No. PCT/JP2012/075367, mailed on Oct. 30, 2012.

* cited by examiner

LIQUID CRYSTAL ELEMENT AND CELL FOR LIQUID CRYSTAL ELEMENT

TECHNICAL FIELD

This invention relates to liquid crystal elements and cells for liquid crystal elements.

BACKGROUND ART

Liquid crystal elements with variable refractive index, such as a liquid crystal lens, have heretofore been proposed. Such liquid crystal elements are needed to decrease the drive voltage. In view of this, for example, Patent Literature 1 proposes a liquid crystal lens in which a transparent insulating layer is interposed between an electrode and a liquid crystal layer and a high-resistivity layer is disposed on a surface of the transparent insulating layer facing the liquid crystal layer. The provision of the high-resistivity layer as described in Patent Literature 1 enables the decrease in drive voltage of the liquid crystal lens.

CITATION LIST

Patent Literature

Patent Literature 1: JP-A-2011-17742

SUMMARY OF INVENTION

Technical Problem

However, the liquid crystal lens described in Patent Literature 1 has a problem of low response speed.

A principal object of the present invention is to provide a liquid crystal element of low drive voltage and high response speed.

Solution to Problem

A liquid crystal element according to the present invention includes a liquid crystal layer, first and second electrodes, a high-resistivity layer, and an inorganic dielectric layer. The first and second electrodes are operable to apply voltage to the liquid crystal layer. The high-resistivity layer is interposed between either one of the first and second electrodes and the liquid crystal layer. The inorganic dielectric layer is interposed between the high-resistivity layer and the liquid crystal layer.

As used in the present invention, the term "high-resistivity layer" refers to a film whose electrical resistance is $1 \times 10^4$ Ω/sq to $1 \times 10^{14}$ Ω/sq at the surface, higher than those of the first and second electrodes, and lower than that of the inorganic dielectric layer.

The liquid crystal element according to the present invention preferably further includes at least one intermediate sheet disposed in the liquid crystal layer to divide the liquid crystal layer in a thickness direction thereof.

The inorganic dielectric layer is preferably formed of at least one of an inorganic oxide dielectric layer and an inorganic fluoride dielectric layer.

The inorganic oxide dielectric layer preferably contains at least one of silicon oxide, aluminum oxide, titanium oxide, tantalum oxide, niobium oxide, and zirconium oxide.

The inorganic fluoride dielectric layer preferably contains magnesium fluoride.

The high-resistivity layer preferably contains at least one of zinc oxide, aluminum zinc oxide, indium tin oxide, antimony tin oxide, gallium zinc oxide, silicon zinc oxide, tin zinc oxide, boron zinc oxide, and germanium zinc oxide.

Either one of the first and second electrodes preferably includes a first electrode portion with an opening and a second electrode portion disposed in the first electrode portion.

A cell for a liquid crystal element according to the present invention is a cell configured, when filled with liquid crystal, to serve as a liquid crystal element. The cell for a liquid crystal element according to the present invention includes a space in which a liquid crystal layer is to be formed, first and second electrodes, a high-resistivity layer, and an inorganic dielectric layer. The high-resistivity layer is interposed between either one of the first and second electrodes and the space. The inorganic dielectric layer is interposed between the high-resistivity layer and the space.

Advantageous Effects of Invention

The present invention can provide a liquid crystal element of low drive voltage and high response speed.

DESCRIPTION OF EMBODIMENTS

Figure 1:
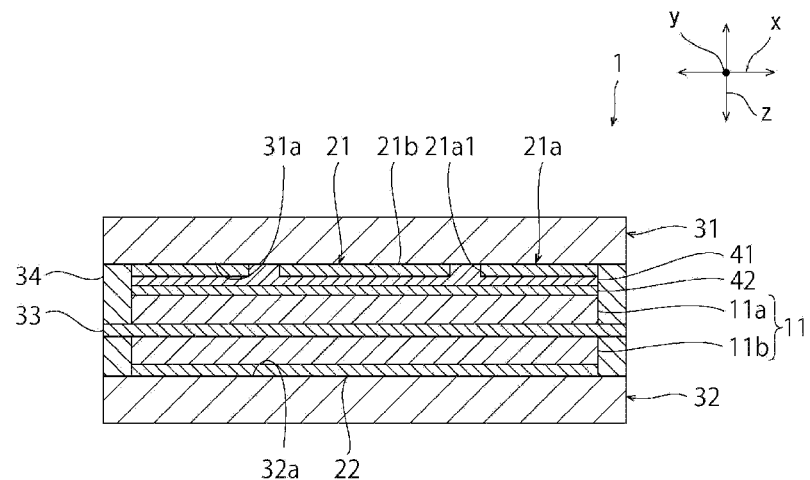
FIG. 1 is a schematic cross-sectional view of a liquid crystal lens according to a first embodiment.
Figure 2:
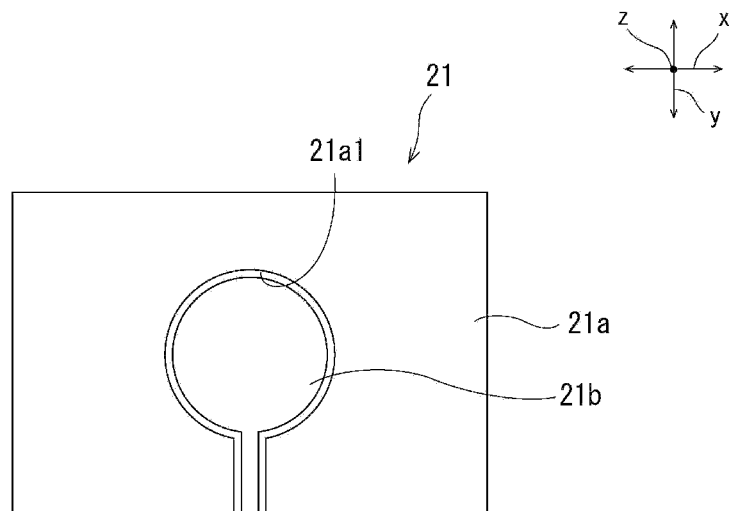
FIG. 2 is a schematic plan view of a first electrode in the first embodiment.

Hereinafter, a description will be given of examples of preferred embodiments for working of the present invention. However, the following embodiments are simply illustrative. The present invention is not at all intended to be limited to the following embodiments.

Throughout the drawings to which the embodiments and the like refer, elements having substantially the same functions will be referred to by the same reference signs. The drawings to which the embodiments and the like refer are schematically illustrated, and the dimensional ratios and the like of objects illustrated in the drawings may be different from those of the actual objects. Different drawings may have different dimensional ratios and the like of the objects. Dimensional ratios and the like of specific objects should be determined in consideration of the following descriptions.

FIG. 1 is a schematic cross-sectional view of a liquid crystal element 1 according to a first embodiment. The liquid crystal element 1 is a liquid crystal lens. The liquid crystal element 1 includes a liquid crystal layer 11 containing liquid crystal molecules. The liquid crystal layer 11 is sandwiched by first and second electrodes 21, 22. The first and second electrodes 21, 22 apply voltage to the liquid crystal layer 11, so that the refractive index of the liquid crystal element 1 changes.

More specifically, the liquid crystal element 1 includes a first substrate 31 and a second substrate 32 which are disposed facing at a distance from each other. A spacer member 34 is interposed between the first substrate 31 and the second substrate 32. The liquid crystal layer 11 is provided in a space defined by the spacer member 34 and the first and second substrates 31, 32.

At least one intermediate sheet 33 is interposed between the first substrate 31 and the second substrates 32. Specifically, in this embodiment, a single intermediate sheet 33 is provided. This intermediate sheet 33 divides the liquid crystal layer 11 along a thickness direction z thereof into a first liquid crystal layer 11a and a second liquid crystal layer 11b. The first substrate 31, the second substrate 32, the intermediate sheet 33, and the spacer member 34 can be made of, for example, glass.

The intermediate sheet 33 may be provided with a communication hole providing communication between the first liquid crystal layer 11a and the second liquid crystal layer 11b. Thus, pressure variations between the first liquid crystal layer 11a and the second liquid crystal layer 11b can be reduced.

An inlet for use in filling liquid crystal may be provided in at least one of the first and second substrates 31, 32 or in the spacer member 34.

The thickness of the first substrate 31 and the second substrate 32 can be, for example, about 0.1 mm to about 1.0 mm. The thickness of the intermediate sheet 33 can be, for example, about 5 μm to about 80 μm. The thickness of the spacer member 34 can be appropriately selected according to the thickness of the liquid crystal layers 11a, 11b dependent on desired optical power, the response speed required for the liquid crystal layers 11a and 11b, or the like. The thickness of the spacer member 34 can be, for example, about 10 μm to about 80 μm.

The first electrode 21 is disposed on a surface 31a of the first substrate 31 close to the liquid crystal layer 11. On the other hand, the second electrode 22 is disposed on a surface 32a of the second substrate 32 close to the liquid crystal layer 11 to face the first electrode 21 with the liquid crystal layer 11 in between. The first and second electrodes 21, 22 can be made of a transparent conductive oxide, such as indium tin oxide (ITO).

The first electrode 21 includes: a first electrode portion 21a with a circular opening 21a1; and a circular second electrode portion 21b disposed inside the opening 21a1 in the first electrode portion 21a. On the other hand, the second electrode 22 is provided in the shape of a sheet to face the first and second electrode portions 21a, 21b.

A voltage V1 is applied between the first electrode portion 21a of the first electrode 21 and the second electrode 22. On the other hand, a voltage V2 is applied between the second electrode portion 21b of the first electrode 21 and the second electrode 22. Normally, the second electrode 22 is set as a ground electrode with a potential of 0 V. Therefore, in this embodiment, out of the first and second electrodes 21 and 22, the electrode with a greater absolute value of potential generated upon application of a voltage is the first electrode 21.

Between, out of the first and second electrodes 21 and 22, the electrode with a greater absolute value of potential generated upon application of a voltage, i.e., the first electrode 21, and the liquid crystal layer 11, a high-resistivity layer 41 is interposed whose electrical resistance is $1 \times 10^4$ Ω/sq to $1 \times 10^{14}$ Ω/sq at the surface, higher than that of the first electrode 11, and lower than that of an inorganic dielectric layer 42 to be described later. Preferably, between the high-resistivity layer 41 and the first electrode 21, an insulating layer is interposed to provide electrical insulation between the high-resistivity layer 41 and the first electrode 21. The insulating layer can be made of, for example, silicon oxide, silicon nitride or the like.

The high-resistivity layer 41 preferably contains at least one of zinc oxide, aluminum zinc oxide, indium tin oxide, antimony tin oxide, gallium zinc oxide, silicon zinc oxide, tin zinc oxide, boron zinc oxide, and germanium zinc oxide.

The high-resistivity layer 41 may be composed of a single high-resistivity layer or a laminate of a plurality of high-resistivity layers. In the case where the high-resistivity layer 41 is composed of a laminate of a plurality of high-resistivity layers, the plurality of high-resistivity layers may be made of the same material or different materials.

The thickness of the high-resistivity layer 41 is preferably, for example, 10 nm to 300 nm.

An inorganic dielectric layer 42 is interposed between the high-resistivity layer 41 and the liquid crystal layer 11. Substantially the entire high-resistivity layer 41 is covered with the inorganic dielectric layer 42. Although not shown, an alignment film is interposed between the inorganic dielectric layer 42 and the liquid crystal layer 11a. The inorganic dielectric layer 42 is covered with the alignment film. Likewise, an alignment film is interposed between the second electrode 22 and the liquid crystal layer 11b to cover the second electrode 22. Alignment films are also disposed on both surfaces of the intermediate sheet 33. These alignment films align liquid crystal molecules in the liquid crystal layer 11. The alignment film can be made of, for example, a rubbed polyimide film.

The inorganic dielectric layer 42 is preferably formed of at least one of an inorganic oxide dielectric layer and an inorganic fluoride dielectric layer. The inorganic oxide dielectric layer preferably contains at least one of silicon oxide, aluminum oxide, titanium oxide, tantalum oxide, niobium oxide, and zirconium oxide. The inorganic fluoride dielectric layer preferably contains magnesium fluoride.

The inorganic dielectric layer 42 may be composed of a single dielectric layer or a laminate of a plurality of dielectric layers. In the case where the inorganic dielectric layer 42 is composed of a laminate of a plurality of dielectric layers, the plurality of dielectric layers may be made of the same material or different materials.

The thickness of the inorganic dielectric layer 42 is preferably about 1 nm to about 2 μm and more preferably about 100 nm to about 1.5 μm.

As thus far described, in the liquid crystal element 1, the high-resistivity layer 41 is interposed between the first electrode 21 and the liquid crystal layer 11. Therefore, a low drive voltage can be achieved.

Furthermore, in the liquid crystal element 1, the inorganic dielectric layer 42 is interposed between the high-resistivity layer 41 and the liquid crystal layer 11 to isolate the high-resistivity layer 41 from the liquid crystal layer 11. Therefore, a high response speed can be achieved. For example, in a liquid crystal element having substantially the same structure except that the inorganic dielectric layer 42 is not provided, the time taken to change the refractive index of the liquid crystal element when the applied voltage between the first and second electrodes is changed by a predetermined voltage is about four to about five seconds. In contrast, in the liquid crystal element 1, the time is about 0.1 to about 0.5 seconds. This results show that the provision of the inorganic dielectric layer 42 enables, for example, an about several ten-fold increase in response speed.

When taken together, by, as in this embodiment, providing the high-resistivity layer 41 between the first electrode 21 and the liquid crystal layer 11 and providing the inorganic dielectric layer 42 between the high-resistivity layer 41 and the liquid crystal layer 11, a liquid crystal element 1 with low drive voltage and high response speed can be achieved.

Although it is not known exactly why the response speed can be increased by interposing the inorganic dielectric layer 42 between the high-resistivity layer 41 and the liquid crystal layer 11, there is a possible reason below.

When the voltage between the first electrode 21 and the second electrode 22 is changed, the electric field distribution changes and the orientation of liquid crystal molecules in the liquid crystal layer 11 accordingly changes. When the orientation of liquid crystal molecules in the liquid crystal layer 11 changes, the permittivity of the liquid crystal layer 11 changes. At this time, if the inorganic dielectric layer 42 is not provided, the change in electric field distribution is slow because the high-resistivity layer and the liquid crystal layer, which are both conductors, are in contact with each other. As a result, the orientation of liquid crystal molecules in the liquid crystal layer gradually changes. It can be considered that since in this manner the change in orientation of liquid crystal molecules in the liquid crystal layer accompanying the change in electric field distribution gradually occurs without the provision of the inorganic dielectric layer, the response speed of the liquid crystal element upon change in voltage between the first electrode and the second electrode becomes slow.

In contrast, in the liquid crystal element 1, the inorganic dielectric layer 42 isolates the high-resistivity layer 1 from the liquid crystal layer 11. The liquid crystal layer 11 is in contact with the inorganic dielectric layer 42 which is not a conductor. Therefore, it can be considered that even when the orientation of liquid crystal molecules in the liquid crystal layer 11 changes and the permittivity of the liquid crystal layer 11 thus changes, the change in electric field distribution is fast. As a result, the orientation of liquid crystal molecules in the liquid crystal layer immediately changes. It can be considered that since in this manner the change in orientation of liquid crystal molecules in the liquid crystal layer accompanying the change in electric field distribution immediately occurs with the provision of the inorganic dielectric layer, the response speed of the liquid crystal element upon change in voltage between the first electrode and the second electrode becomes fast.

Furthermore, by disposing the inorganic dielectric layer 42 to cover the high-resistivity layer 41, the change over time of the electrical resistance of the high-resistivity layer 41 can be reduced. Therefore, the change over time of characteristics, such as the drive voltage, of the liquid crystal element 1 can be reduced.

Figure 4:
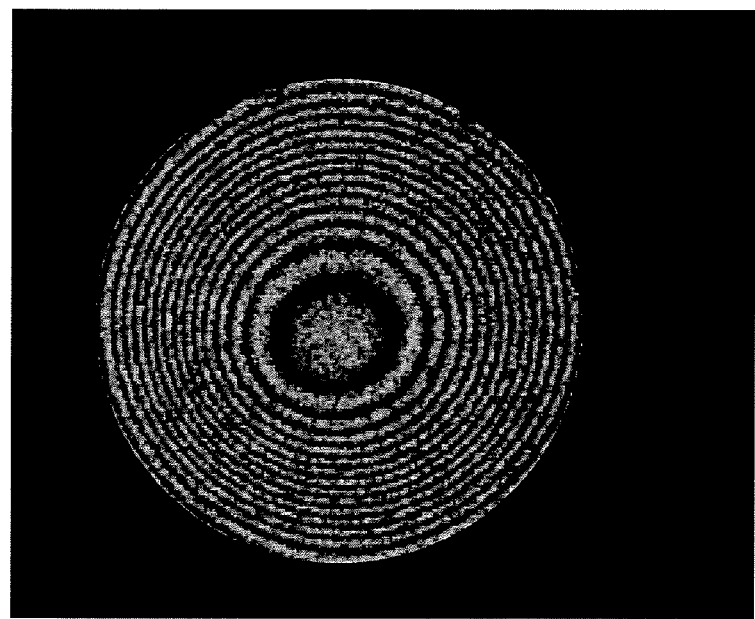
FIG. 4 is wavefront aberration of a liquid crystal element immediately after being produced in an example.
Figure 5:
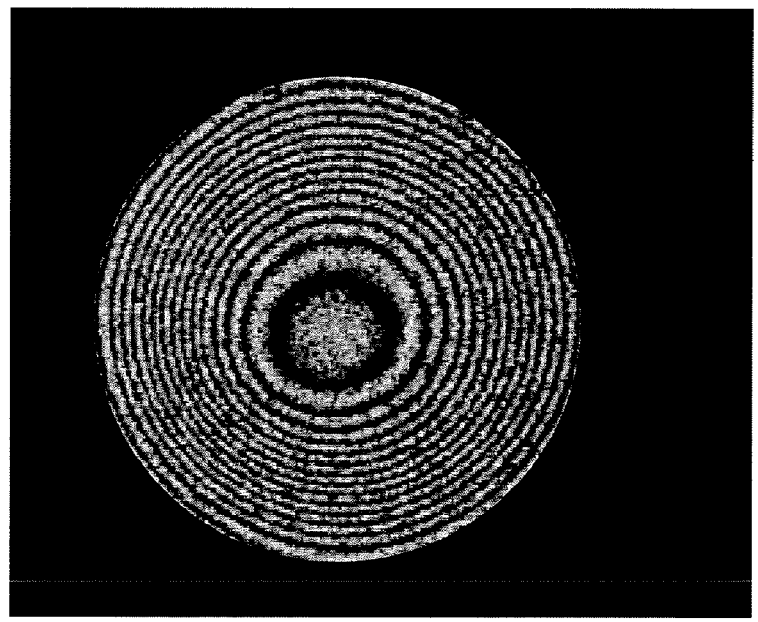
FIG. 5 is wavefront aberration of the liquid crystal element 180 days after being produced in the example.
Figure 6:
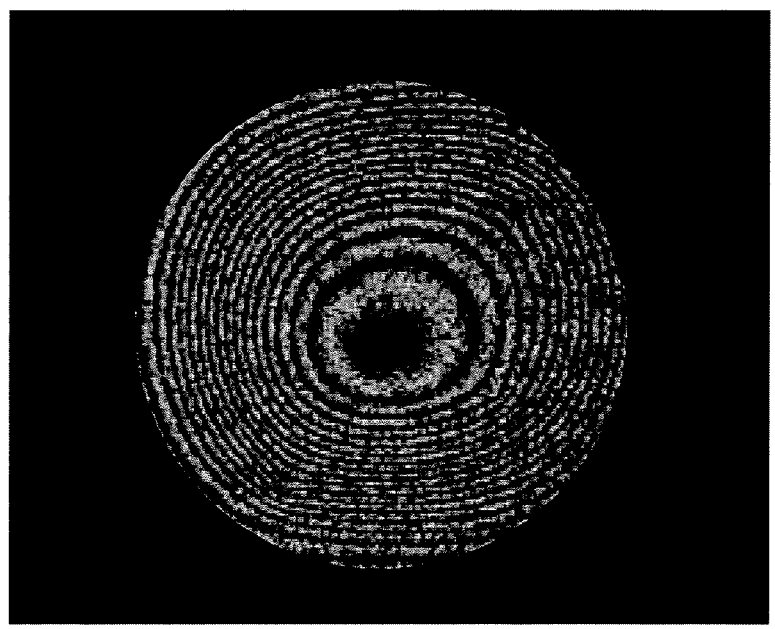
FIG. 6 is wavefront aberration of a liquid crystal element immediately after being produced in a comparative example.
Figure 7:
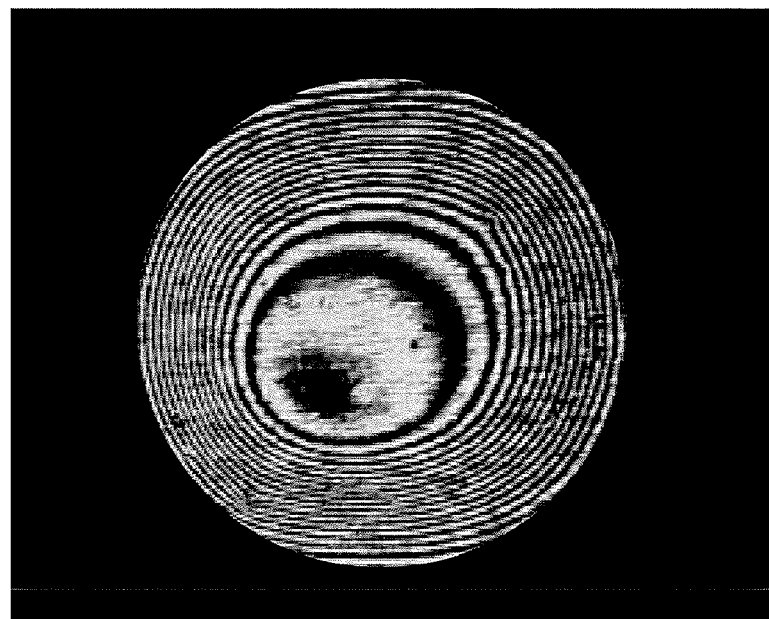
FIG. 7 is wavefront aberration of the liquid crystal element 180 days after being produced in the comparative example.

FIG. 4 is wavefront aberration of a liquid crystal element immediately after being produced in an example. FIG. 5 is wavefront aberration of the liquid crystal element 180 days after being produced in the example. FIG. 6 is wavefront aberration of a liquid crystal element immediately after being produced in a comparative example. FIG. 7 is wavefront aberration of the liquid crystal element 180 days after being produced in the comparative example.

In the example shown in FIGS. 4 and 5, a zinc oxide film (thickness: 125 nm) containing Al was provided as the high-resistivity layer 41 and a silicon oxide layer (thickness: 125 nm) was provided as the inorganic dielectric layer 42. On the other hand, in the comparative example shown in FIGS. 6 and 7, the high-resistivity layer 41 similar to that in the example was provided but the inorganic dielectric layer 42 was not provided.

The results shown in FIGS. 4 and 5 reveal that in the example where the inorganic dielectric layer 42 was provided, the wavefront aberration was less likely to deteriorate over time. On the other hand, the results shown in FIGS. 6 and 7 reveal that in the comparative example where the inorganic dielectric layer 42 was not provided, the wavefront aberration deteriorated over time. As seen from these results, the provision of the inorganic dielectric layer 42 enables reduction in deterioration over time of the wavefront aberration.

Although it is not known exactly why the wavefront aberration deteriorated over time in the comparative example, it can be attributed to deterioration of the high-resistivity layer 41 and the attendant occurrence of in-plane variations in resistance value of the high-resistivity layer 41.

Furthermore, in the case where, as in the liquid crystal element 1, the liquid crystal layer 11 is divided into plural layers in the thickness direction by the intermediate sheet 33, the thickness of each liquid crystal layer 11a, 11b can be reduced while the overall thickness of the liquid crystal layer 11 remains large. Therefore, a higher response speed can be achieved.

Although in this embodiment a description has been given of the case where a single intermediate sheet dividing the liquid crystal layer in the thickness direction is provided, a plurality of intermediate sheets may be provided. In other words, the liquid crystal layer may be divided into, for example, three or more liquid crystal layers. The liquid crystal layer may be divided into, for example, four liquid crystal layers.

In the liquid crystal element 1, a description has been given of an example where the high-resistivity layer 41 is composed of a single film. However, the present invention is not limited to this structure. A laminate of a plurality of high-resistivity layers may be provided. Likewise, a laminate of a plurality of inorganic dielectric layers may be provided. In this case, the laminate of a plurality of inorganic dielectric layers may form a reflection suppression layer capable of suppressing interface reflection. For example, the laminate of a plurality of inorganic dielectric layers may contain a low refractive index layer of relatively low refractive index and a high refractive index layer of relatively high refractive index provided in contact with the low refractive index layer.

Figure 3:
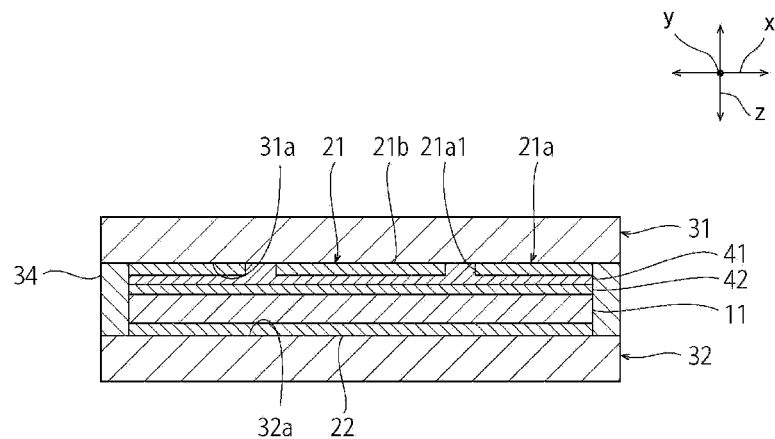
FIG. 3 is a schematic cross-sectional view of a liquid crystal lens according to a second embodiment.

Furthermore, as shown in FIG. 3, the liquid crystal element may include no intermediate sheet and include a single liquid crystal layer 11.

Moreover, the liquid crystal element of the present invention may be any liquid crystal element other than the liquid crystal lens.

REFERENCE SIGNS LIST

1 . . . liquid crystal element
11 . . . liquid crystal layer
11a . . . first liquid crystal layer
11b . . . second liquid crystal layer
21 . . . first electrode
21a . . . first electrode portion
21a1 . . . opening
21b . . . second electrode portion
22 . . . second electrode
31 . . . first substrate
31a . . . surface of the first substrate 32 ... second substrate
32a ... surface of the second substrate
33 ... intermediate sheet
34 ... spacer member
41 ... high-resistivity layer
42 ... inorganic dielectric layer

The invention claimed is:

1. A liquid crystal element comprising:
a liquid crystal layer;
first and second electrodes operable to apply a voltage to the liquid crystal layer;
a high-resistivity layer interposed between the first electrode and the liquid crystal layer; and
an inorganic dielectric layer interposed between the high-resistivity layer and the liquid crystal layer; wherein
the first electrode includes a first electrode portion with an opening therein, and a second electrode portion disposed inside the opening; and
an electrical resistance of the high-resistivity layer is lower than an electrical resistance of the inorganic dielectric layer.

2. The liquid crystal element according to claim 1, further comprising at least one intermediate sheet disposed in the liquid crystal layer to divide the liquid crystal layer in a thickness direction thereof.

3. The liquid crystal element according to claim 1, wherein the inorganic dielectric layer is formed of at least one of an inorganic oxide dielectric layer and an inorganic fluoride dielectric layer.

4. The liquid crystal element according to claim 3, wherein the inorganic oxide dielectric layer contains at least one of silicon oxide, aluminum oxide, titanium oxide, tantalum oxide, niobium oxide, and zirconium oxide.

5. The liquid crystal element according to claim 3, wherein the inorganic fluoride dielectric layer contains magnesium fluoride.

6. The liquid crystal element according to claim 1, wherein the high-resistivity layer contains at least one of zinc oxide, aluminum zinc oxide, indium tin oxide, antimony tin oxide, gallium zinc oxide, silicon zinc oxide, tin zinc oxide, boron zinc oxide, and germanium zinc oxide.

7. A cell for a liquid crystal element configured, when filled with liquid crystal, to serve as a liquid crystal element, the cell comprising:
a space in which a liquid crystal layer is to be formed;
first and second electrodes;
a high-resistivity layer interposed between the first electrode and the space; and
an inorganic dielectric layer interposed between the high-resistivity layer and the space; wherein
the first electrode includes a first electrode portion with an opening therein, and a second electrode portion disposed inside the opening; and
an electrical resistance of the high-resistivity layer is lower than an electrical resistance of the inorganic dielectric layer.

* * * * *